United States Patent
Martin et al.

(10) Patent No.: US 9,688,244 B2
(45) Date of Patent: Jun. 27, 2017

(54) AUTONOMOUS VEHICLE THEFT PREVENTION

(71) Applicant: Ford Global Technologies, LLC, Dearborn, MI (US)

(72) Inventors: Douglas Raymond Martin, Canton, MI (US); Mark Anthony Rockwell, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 14/739,637

(22) Filed: Jun. 15, 2015

(65) Prior Publication Data

US 2016/0362084 A1    Dec. 15, 2016

(51) Int. Cl.
*B60R 25/00* (2013.01)
*G01C 21/34* (2006.01)
*H04L 9/30* (2006.01)

(52) U.S. Cl.
CPC .............. *B60R 25/00* (2013.01); *G01C 21/34* (2013.01); *H04L 9/30* (2013.01)

(58) Field of Classification Search
CPC ...... H04L 63/04; H04L 63/0428; G06F 21/88
USPC ............................................. 705/13; 455/414
See application file for complete search history.

(56) References Cited

U.S. PATENT DOCUMENTS

| | | | |
|---|---|---|---|
| 1,310,719 A | 7/1919 | Vernam | |
| 5,787,367 A | 7/1998 | Berra | |
| 7,660,902 B2 * | 2/2010 | Graham | G06F 21/6245 709/203 |
| 8,532,300 B1 | 9/2013 | Searles | |
| 8,533,474 B2 | 9/2013 | Schneider | |
| 8,625,791 B2 | 1/2014 | Massoudi et al. | |
| 8,838,748 B2 * | 9/2014 | Nair | G06F 8/38 709/203 |
| 8,849,494 B1 * | 9/2014 | Herbach | B60W 30/00 701/24 |
| 9,501,061 B2 * | 11/2016 | Canoy | G05D 1/0816 |
| 2002/0002675 A1 | 1/2002 | Bush | |
| 2004/0056770 A1 * | 3/2004 | Metcalf | B64D 45/0015 340/574 |
| 2006/0041337 A1 | 2/2006 | Augsburger et al. | |
| 2009/0119657 A1 * | 5/2009 | Link, II | G06F 8/65 717/171 |
| 2010/0012774 A1 * | 1/2010 | Fanucci | B64C 39/024 244/49 |
| 2010/0191973 A1 | 7/2010 | Huntzicker et al. | |
| 2010/0211787 A1 * | 8/2010 | Bukshpun | H04L 9/0838 713/170 |
| 2012/0030470 A1 | 2/2012 | Jdanov et al. | |
| 2012/0324233 A1 | 12/2012 | Nguyen et al. | |

(Continued)

*Primary Examiner* — Dede Zecher
*Assistant Examiner* — Viral Lakhia
(74) *Attorney, Agent, or Firm* — Jennifer M. Stec; Brooks Kushman P.C.

(57) ABSTRACT

A destination request may specify a destination location for an autonomous vehicle identified by a vehicle identifier. The request may be for uniqueness of a timestamp of the destination request. An encrypted payload of the request may be decrypted to identify the destination location using a long key associated with the vehicle identifier and indexed to a key offset determined using the timestamp. A driving command may be sent to the autonomous vehicle specifying the destination location.

17 Claims, 4 Drawing Sheets

(56) References Cited

U.S. PATENT DOCUMENTS

| | | | |
|---|---|---|---|
| 2013/0061044 A1* | 3/2013 | Pinkus | H04L 67/12 713/160 |
| 2013/0310010 A1* | 11/2013 | Yi | H04W 4/20 455/414.1 |
| 2014/0067491 A1* | 3/2014 | James | G06Q 50/30 705/13 |
| 2014/0270172 A1* | 9/2014 | Peirce | H04L 9/0819 380/270 |
| 2014/0282470 A1* | 9/2014 | Buga | G06F 8/65 717/170 |
| 2015/0163306 A1* | 6/2015 | Nakagawa | B60R 25/2018 709/225 |
| 2015/0166009 A1* | 6/2015 | Outwater | B60R 25/04 701/2 |
| 2015/0260826 A1* | 9/2015 | Shue | G01S 5/0263 455/456.1 |
| 2015/0334113 A1* | 11/2015 | Angus | H04L 63/0428 713/168 |
| 2015/0350914 A1* | 12/2015 | Baxley | H04W 12/08 726/11 |
| 2015/0351084 A1* | 12/2015 | Werb | H04W 12/08 370/329 |
| 2016/0125735 A1* | 5/2016 | Tuukkanen | G08G 1/09 701/23 |

* cited by examiner

AUTONOMOUS VEHICLE THEFT PREVENTION

TECHNICAL FIELD

Aspects of the disclosure relate to messaging techniques to mitigate theft of autonomous vehicles and their contents.

BACKGROUND

Vehicle theft has been a problem since vehicles have existed. Traditionally, a thief of a vehicle or its contents would have to be physically present to steal a vehicle. With the advent of autonomous vehicles, it may be possible for a thief to remotely steal a car and its contents/passengers by using infrastructure-to-vehicle communications to reroute the vehicle to a location for disassembly, resale or content removal.

SUMMARY

In a first illustrative embodiment, a system includes a server configured to receive, over a network from a requesting device, an encrypted payload of a destination request specifying a destination location for an autonomous vehicle, validate uniqueness of a timestamp of the destination request, decrypt the encrypted payload to identify the destination location using a long key indexed to a key offset determined using the timestamp, and send a driving command to the autonomous vehicle specifying the destination location.

In a second illustrative embodiment, a system includes a mobile device configured to a mobile device configured to receive a destination location for an autonomous vehicle; generate a destination request specifying the destination location; identify a key offset into a long key using a timestamp of the destination request; encrypt a payload of the destination request using the key offset; and send the destination request to a server to forward to the autonomous vehicle.

In a third illustrative embodiment, a computer-implemented method includes receiving a request specifying a destination for an autonomous vehicle identified by a vehicle identifier; validating uniqueness of a request timestamp for the vehicle identifier; decrypting a request payload to identify the destination using a long key associated with the vehicle identifier and indexed to a key offset determined using the timestamp; and sending a driving command to the autonomous vehicle specifying the destination.

DETAILED DESCRIPTION

As required, detailed embodiments are disclosed herein; however, it is to be understood that the disclosed embodiments are merely representative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments.

An improved vehicle communication system may utilize an autonomous vehicle security server to verify that commands being exchanged across networked system components are legitimate and not from an unauthorized source. The vehicle command system may accordingly reduce a risk of an unauthorized user sending a command to an autonomous vehicle that would cause the vehicle to head to a destination where the vehicle or its contents may be stolen.

When a vehicle operator or user is present, the vehicle may authenticate the operator based on presence of a key fob programmed to access the vehicle, or by user entry of a passcode into the vehicle (e.g., into a keypad of the vehicle). When such an authorized user is present, user input provided to a navigational system of the vehicle may be considered by the vehicle to be authenticated due to the presence of the authorized user. For instance, an authorized user may enter in a passcode, and may enter in a destination for the vehicle to autonomously navigate itself to reach. Notably, the authorized user need not travel along with the vehicle, as the destination may be considered validated by the vehicle due to the initial presence of the user.

In other examples, a user may utilize a mobile device to send a request that the vehicle is to be moved to a destination location. The request may include information such as a correct vehicle identification number (VIN) of the selected vehicle, a timestamp that the request is sent, and an encrypted portion including further details. For instance, the encrypted portion may include the VIN of the vehicle, an identifier of the user requesting a change in vehicle destination, a message identifier indicating the message specifies a destination, global positioning coordinates (GPS) of the destination, and an end-of-message marker. The mobile device may send the message to an autonomous vehicle security server for processing. In an example, the encryption of the message may be performed using a technique such as that described in commonly-assigned Ser. No. 14/565,899, titled "ENCRYPTION FOR TELEMATICS FLASHING OF A VEHICLE," the disclosure of which is hereby incorporated in its entirety by reference herein.

The autonomous vehicle security server may receive and read the received request, and may perform decryption on the encrypted portion of the message. Once decrypted, the autonomous vehicle security server may confirm aspects of the data included in the encrypted portion. As one possibility, the autonomous vehicle security server may confirm that a VIN of the vehicle included in the encrypted portion, as decrypted, matches the same information provided in the unencrypted portion of the request message. As another possibility, to avoid replay attacks the autonomous vehicle security server may confirm that a timestamp included in the message has not been previously used.

If the message is confirmed, the autonomous vehicle security server may send a command to the vehicle requesting for the vehicle to autonomously navigate itself to the destination. If the message is not confirmed, the autonomous vehicle security server may reject the request message, and may raise an authentication failure alert. Thus, by way of the message encryption and validations used, the autonomous vehicle command system may detect and avoid replay attacks or other malicious messages being sent to autonomous vehicles.

Figure 1:
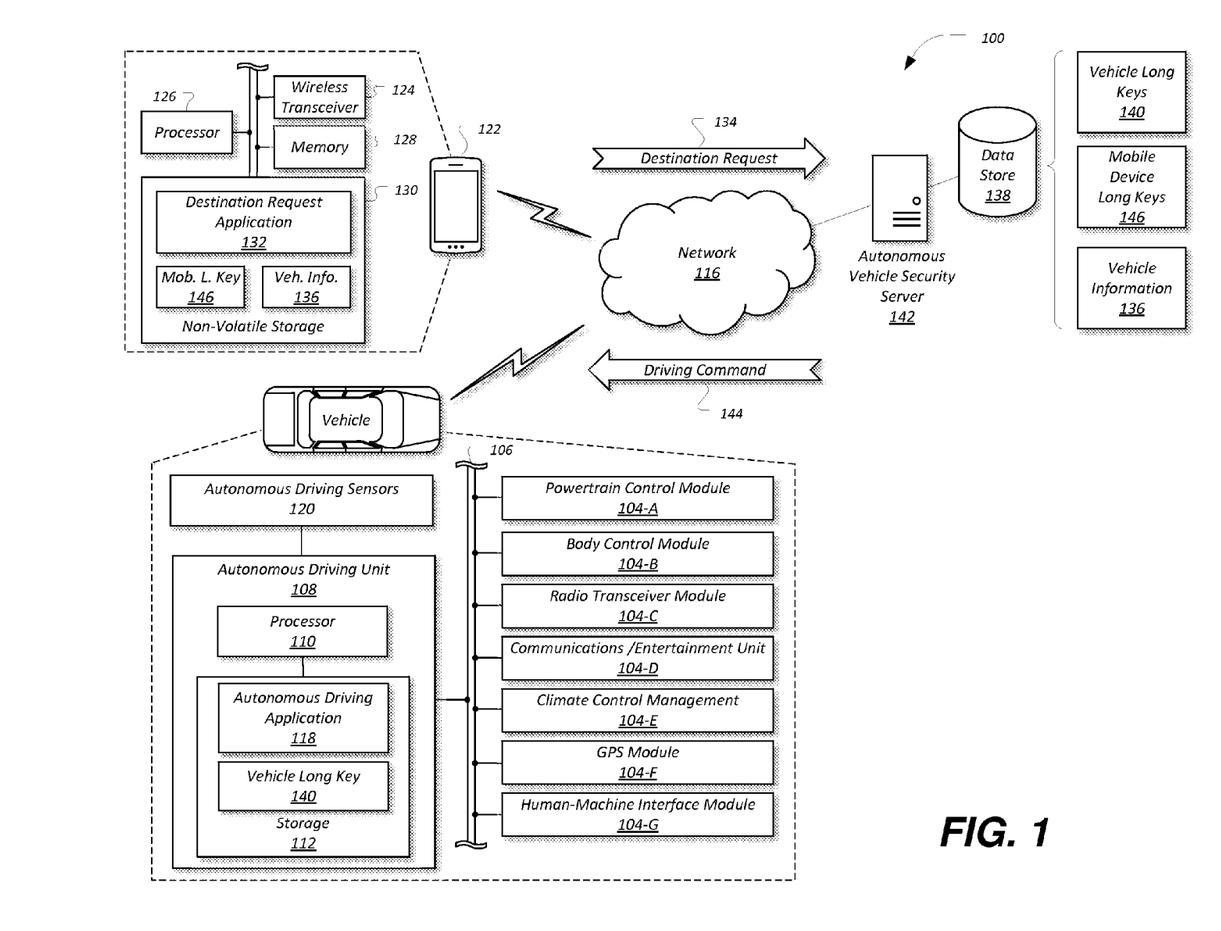
FIG. 1 illustrates an example system for receiving destination requests and providing driving commands to autonomous vehicles.

FIG. 1 illustrates an example system 100 for receiving destination requests 134 and providing driving commands 144 to autonomous vehicles 102. The system may include a mobile device 122 configured to send the destination requests 134 over a communications network 116, an autonomous vehicle security server 142 configured to receive and validate the destination requests 134, and one or more vehicles 102 configured to receive driving commands 144 by an autonomous driving unit 108 of the vehicle 102. The autonomous vehicle security server 142 may communicate with a data store 138 configured to maintain vehicle identification information 136, and vehicle long keys 140 associated with the vehicle identification information 136. The long key 140 associated with the vehicle 102 may also be stored to the autonomous driving unit 108 of the vehicle 102 being commanded. A mobile device long key 146 may be installed to the mobile device 122 commanding the vehicle 102 and may also be stored by the data store 138. An autonomous driving application 118 installed to the autonomous driving unit 108 may process the destination requests 134 received via the autonomous driving unit 108 and may utilize autonomous driving sensors 120 to aid in commanding the vehicle 102 in an automated manner to the specified destination. While an example system 100 is shown in FIG. 1, the example components illustrated are not intended to be limiting. Indeed, the system 100 may have more or fewer components, and additional or alternative components and/or implementations may be used.

The autonomous vehicle 102 may include various types of automobile, crossover utility vehicle (CUV), sport utility vehicle (SUV), truck, recreational vehicle (RV), boat, plane or other mobile machine for transporting people and/or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicle 102 may have different capabilities with respect to cargo capacity, passenger capacity, and towing ability.

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-G. However, the vehicle ECUs 104 may share physical hardware, firmware, and/or software, such that the functionality from multiple ECUs 104 may be integrated into a single ECU 104, and that the functionality of various such ECUs 104 may be distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control ECU 104-A may be configured to provide control of engine operating components; a body control ECU 104-B may be configured to manage various power control functions such as exterior lighting, interior lighting, keyless entry, remote start, and point of access status verification; a radio transceiver ECU 104-C may be configured to communicate with key fobs, mobile devices, or other local vehicle 102 devices; an entertainment control unit 104-D may be configured to support voice command and BLUETOOTH interfaces with the driver and driver carry-on devices; a climate control management ECU 104-E may be configured to provide control of heating and cooling system components (e.g., compressor clutch, blower fan, temperature sensors, etc.) to manage climate in cargo and/or passenger compartments; and a global positioning system (GPS) ECU 104-F may be configured to provide vehicle location information; and a human-machine interface (HMI) ECU 104-G may be configured to receive user input via various buttons or other controls, as well as provide vehicle status information to a driver or other vehicle 102 occupants.

The vehicle bus 106 may include various method of communication available between the vehicle ECUs 104, as well as between the autonomous driving unit 108 and the vehicle ECUs 104. As some non-limiting examples, the vehicle bus 106 may include one or more of a vehicle controller area network (CAN), an Ethernet network, and a media oriented system transfer (MOST) network.

The autonomous driving unit 108 may include a cellular modem or other network hardware configured to facilitate communication over the communications network 116 between the vehicle 102 and other devices of the system 100. The network 116 may include one or more interconnected communication networks such as the Internet, a cable television distribution network, a satellite link network, a local area network, a wide area network, and a telephone network, as some non-limiting examples.

The autonomous driving unit 108 may further include various types of computing apparatus to facilitate the performance of autonomous driving functions. In an example, the autonomous driving unit 108 may include one or more processors 110 configured to execute computer instructions, and a storage medium 112 on which the computer-executable instructions may be maintained. A computer-readable storage medium 112 (also referred to as a processor-readable medium 112 or storage 112) includes any non-transitory (e.g., tangible) medium that participates in providing data (e.g., instructions) that may be read by a computer (e.g., by the processor(s) 110). In general, a processor 110 receives instructions, e.g., from the storage 112, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The autonomous driving application 118 may be one application included on the storage 112 of the autonomous driving unit 108. The autonomous driving application 118 may include instructions that, when executed by the processor 110 of the autonomous driving unit 108, cause the autonomous driving unit 108 to provide autonomous driving commands to the ECUs 104 or other vehicle 102 components via the vehicle bus 106. As some possibilities, the autonomous driving application 118 may include steering algorithms, braking algorithms, throttle algorithms, and user experience/human machine interface functionality configured to provide for automated driving of the vehicle 102 to a specified destination.

The autonomous driving unit 108 may further receive data from one or more autonomous driving sensors 120 configured to provide input to the autonomous driving application 118. In some cases, the autonomous driving sensors 120 may be connected to the vehicle bus 106, while in other cases, one or more of the autonomous driving sensors 120 may be connected to the autonomous driving unit 108 directly or otherwise without use of the vehicle bus 106. In an example, the autonomous driving sensors 120 may include one or more video camera devices configured to capture information regarding the surroundings of the vehicle 102. In another example, the autonomous driving sensors 120 may include laser, radar, sonar, or other types of distance and/or obstacle sensors. The autonomous driving sensors 120 may also include various vehicle connectivity modules configured to facilitate communication between the autonomous driving unit 108 and other sources of information. In an example, the autonomous driving sensors 120 may facilitate communication of the autonomous driving unit 108 with vehicle infrastructure, such as traffic lights or other traffic controls, which may provide information regarding upcoming situations to which the autonomous driving application 118 may wish to respond. In another example, autonomous driving sensors 120 may facilitate communication of the autonomous driving unit 108 with other vehicles 102, to allow the vehicle 102 to receive information regarding the current status or intended actions of others within the vicinity of the vehicle 102.

The mobile devices 122 may be any of various types of portable computing device, such as cellular phones, tablet computers, smart watches, laptop computers, portable music players, or other devices capable of communication over the communications network 116. In an example, the mobile devices 122 may communicate with the communication network 116 via a wireless transceiver 124 of the mobile device 122. Similar to the autonomous driving unit 108, the mobile devices 122 may include one or more processors 126 configured to execute instructions of mobile applications loaded to a memory 128 of the mobile device 122 from storage medium 130 of the mobile device 122. A destination request application 132 may be an example of a mobile application installed to the mobile device 122. The destination request application 132 may be configured to receive input (e.g., user input to a user interface of the mobile device 122), and send destination requests 134 to the autonomous vehicle security server 142, as discussed in greater detail below.

The vehicle identification information 136 may include information configured to identify the vehicle 102 or the configuration of the vehicle 102. As some examples, the vehicle identification information 136 may include a vehicle identification number (VIN) (e.g., as published to the vehicle bus 106), or subscriber identity module (SIM) information of the modem used by the autonomous driving unit 108, such as international mobile station equipment identity (IMEI).

The data store 138 may be configured to store vehicle long keys 140 and mobile device long keys 146. The vehicle long keys 140 and mobile device long keys 146 may be used for encryption of communications of the system 100. The long key 140 may include a random string of bytes or other information shared by the data store 138 and the vehicle 102. The long key 146 may similarly include a random string of bytes or other information, but may be shared by the data store 138 and the mobile devices 122. In some examples, the mobile device long key 146 may be shorter in length than the long key 140, but still long relative to the length of data encoded using the mobile device long key 146. This may be, for example, as the length of the destination requests 134 provided by the mobile devices 122 may be significantly shorter than the length of transmissions to the vehicle 102 encoded using the long key 140, which may include, for example, revised firmware for flashing of vehicle ECUs 104. In some implementations the long key 146 and the long key 140 for a vehicle 102 could be the same key, but in many implementations the long key 146 and the long key 140 may be different, as the vehicle 102 may be expected to have a longer life than the user may elect to keep the mobile device 102, and also to ensure that a compromising of the mobile device 122 cannot also compromise the vehicle long key 140.

In an example, the long key 140 may be maintained in the storage device 112 of the autonomous driving unit 108 of the vehicle 102, the long key 146 in the storage 130 of any mobile devices 122 sending destination requests 134 to the autonomous vehicle security server 142, and the long key 140 and the long key 146 in the data store 138 indexed according to vehicle identification information 136 (e.g., a VIN of the vehicle 102 with which the long key 140 is associated). In another example, each mobile device 112 may include its own mobile device long key 146, or its own mobile device long key 146 for each vehicle 102 with which the mobile device 122 is configured to command.

The autonomous vehicle security server 142 may include one or more devices configured to validate requests to be sent to the vehicles 102 according to information stored by the data store 138. For example, the autonomous vehicle security server 142 may be configured to receive destination requests 134 from vehicles 102. The destination requests 134 may include vehicle identification information 136 to allow the autonomous vehicle security server 142 to query the data store 138 for the long key 140 applicable to the vehicle 102. The autonomous vehicle security server 142 may provide, responsive to the destination requests 134, driving commands 144 to be forwarded to the requesting vehicles 102 themselves that may be received and executed by the vehicles 102. The autonomous vehicle security server 142 may be further configured to encrypt the driving commands 144 according to the long key 140 for the vehicle 102, and provide the encrypted driving commands 144 to the vehicles 102 when the destination requests 134 are valid. When the destination request 134 is invalid, the autonomous vehicle security server 142 may reject the destination request 134, and may raise an authentication failure alert.

The autonomous driving application 118 may be further configured to facilitate the decryption and execution of received driving commands 144. For example, as discussed in detail below, the autonomous driving application 118 may be configured to decrypt the received driving commands 144 according to the long key 140 as maintained by the vehicle 102, and navigate the vehicle 102 to destination locations as indicated by the driving commands 144.

Figure 2:
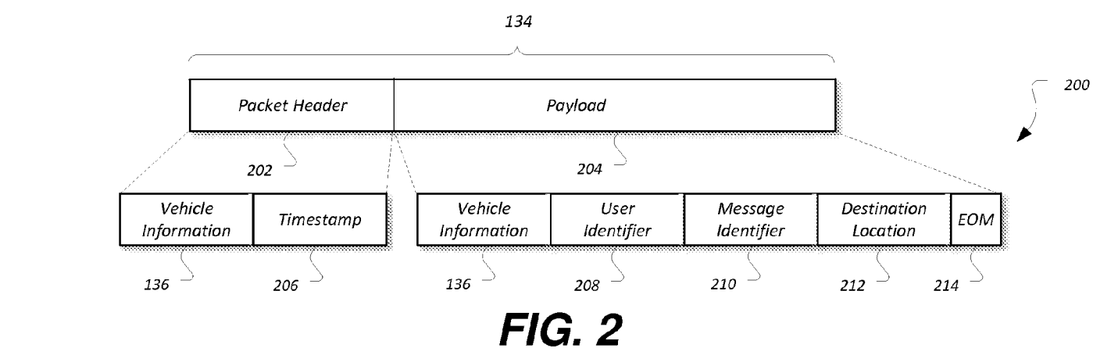
FIG. 2 illustrates an example diagram of a destination request.

FIG. 2 illustrates an example diagram of a destination request 134. As shown, the destination request 134 may include a packet header 202 and a payload 204. The packet header 202 may include information such as the vehicle identification information 136 of the vehicle 102 to be commanded (e.g., VIN), and a timestamp 206 at which the destination request 134 was sent. The payload 204 may include information such as an encrypted version of the vehicle identification information 136 of the vehicle 102 to be commanded, a user identifier 208 of the user requesting a change in vehicle destination, a message identifier 210 indicating that the message is a navigation message, destination location 212 information such as GPS coordinates of the destination being requested for the vehicle 102, and an end-of-message marker 214 signifying the end of the destination request 134.

Figure 3:
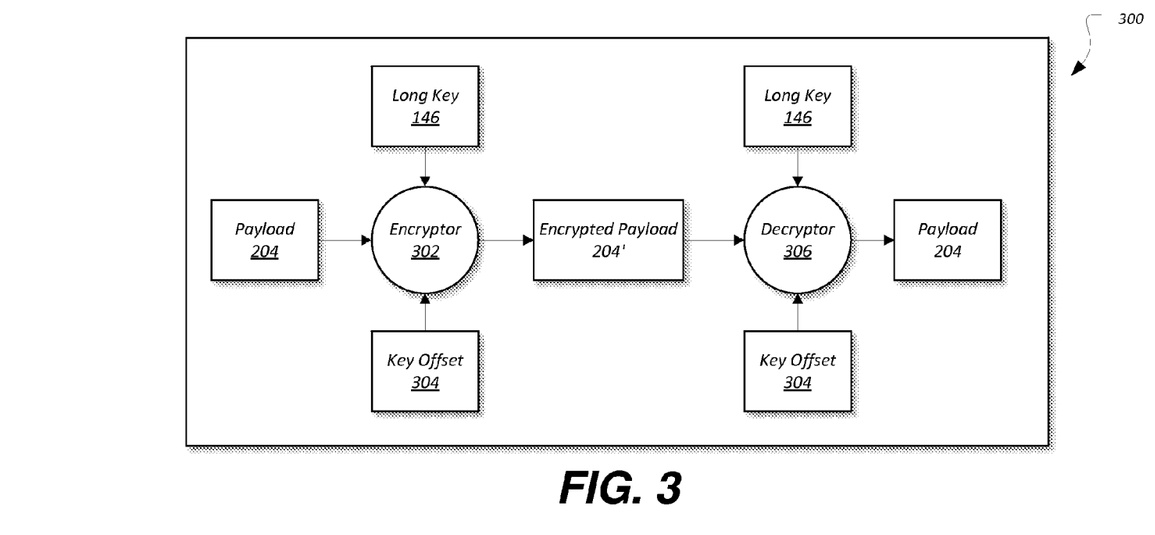
FIG. 3 illustrates an example diagram of encryption and decryption of a destination request.

FIG. 3 illustrates an example diagram 300 of encryption and decryption of a destination request 134. As shown, the encryptor 302 may be configured to generate an encrypted payload 204' using the payload 204, the long key 146, and a key offset 304 into the long key 146. Moreover, the decryptor 306 may be configured to regenerate the original payload 204 using the encrypted payload 204', the long key 146, and the key offset 304. The long key 146 may be independently maintained by the encryptor 302 and the decryptor 306 to allow for the encryption and decryption to be performed. As the packet header 202 is not encrypted by the encryptor 302, the decryptor 306 may utilize the vehicle identification information 136 included in the packet header 202 to identify the long key 146 to use for decryption, and may further determine key offset 304 according to the timestamp 206 also included in the packet header 202.

In an example, the destination request application 132 of the mobile device 122 or another requester of a destination for the vehicle 102 may perform the operations of the encryptor 302 before providing the destination request 134 to the autonomous vehicle security server 142, and the autonomous vehicle security server 142 may perform the operations of the decryptor 306 for received destination request 134 to be validated by the autonomous vehicle security server 142. In a similar example, the autonomous vehicle security server 142 may perform the operations of the encryptor 302 for the driving command 144 before providing a driving command 144 to the vehicle 102 (although using the vehicle long key 140), and the autonomous driving application 118 may perform the operations of the decryptor 306 for received encrypted driving command 144' to be executed by the vehicle 102 (again using the vehicle long key 140).

As a more detailed example, the destination request application 132 of the mobile device 122 requesting a destination for the vehicle 102 may encrypt the payload 204 into the encrypted payload 204' for network transport. The destination request 134 may include a timestamp 206 which, due to its inclusion in the destination request 134, will be known to both the encryptor 302 and the autonomous vehicle security server 142 operating as the decryptor 306 when the destination request 134 is received by the autonomous vehicle security server 142. This timestamp 206 value may be used to determine the key offset 304 into the long key 146 to use for the encryption and decryption operations, rather than having the encryptor 302 and decryptor 306 utilize the long key 146 from the beginning of the long key 146 each use. In an example, the destination request application 132 may utilize the timestamp 206 value to generate a number that may be used as an offset into the long key 146. Use of the key offset 304 may accordingly protect the beginning of the long key 146 from being reused for each destination request 134 and potentially becoming vulnerable to attack (e.g., if the destination request 134 is includes known initial signature at the beginning (e.g., the vehicle identification information 136), the initial bytes of the long key 146 may be exposed repeatedly).

Having the long key 146 and having identified the key offset 304, the destination request application 132 may encrypt each byte of the payload 204 using a different byte of the long key 146. For instance, the destination request application 132 may generate a first byte of the encrypted payload 204' by adding a first byte of the payload 204 to the first byte of the long key 146 at the key offset 304, and may generate the second byte of the encrypted payload 204' by adding a second byte of the payload 204 to the second byte of the long key 146 at the key offset 304. In another example, the destination request application 132 may generate a first byte of the encrypted payload 204' by adding a first byte of the payload 204 with the first byte of the long key 146 at the key offset 304 ignoring overflow if any, and may generate the second byte of the encrypted payload 204' by adding a second byte of the payload 204 with the second byte of the long key 146 at the key offset 304. Alternatively, the destination request application 132 may generate a first byte of the encrypted payload 204' by XORing a first byte of the payload 204 with the first byte of the long key 146 at the key offset 304, and may generate the second byte of the encrypted payload 204' by XORing a second byte of the payload 204 with the second byte of the long key 146 at the key offset 304. The destination request application 132 may continue generating of the encrypted payload 204' in such a manner until the payload 204 is fully encrypted into the encrypted payload 204'. The destination request 134 including the packet header 202 and the encrypted payload 204' may then be sent over the network 116 to the decryptor 306, e.g., to the autonomous vehicle security server 142.

Receiving the destination request 134, the autonomous vehicle security server 142 decryptor 306 may identify the proper long key 146 for the vehicle 102 according to the vehicle identification information 136 included in the destination request 134. In an example, the autonomous vehicle security server 142 may retrieve the long key 146 from the data store 138 according to a VIN of the vehicle 102 included in the vehicle identification information 136 of the packet header 202 of the destination request 134. The autonomous vehicle security server 142 may also determine the key offset 304 according to the destination request 134. In an example, the decryptor 306 may utilize the timestamp 206 value included in the packet header 202 of the destination request 134 to generate a number that may be used as the key offset 304 into the long key 146, in the same manner as done to generate the key offset 304 by the encryptor 302 destination request application 132.

Having identified the appropriate long key 146 and key offset 304, the autonomous vehicle security server 142 may decrypt each byte of the encrypted payload 204' using a different byte of the long key 146. For instance, the autonomous vehicle security server 142 may generate a first byte of the decrypted payload 204 by adding a first byte of the encrypted payload 204' to the first byte of the long key 146 at the key offset 304, and may generate the second byte of the decrypted payload 204 by adding a second byte of the encrypted payload 204' to the second byte of the long key 146 at the key offset 304. In another example, the autonomous vehicle security server 142 may generate a first byte of the decrypted payload 204 by subtracting a first byte of the encrypted payload 204' with the first byte of the long key 146 at the key offset 304 ignoring carry-out, and may generate the second byte of the encrypted payload 204' by subtracting a second byte of the decrypted payload 204 with the second byte of the long key 146 at the key offset 304 ignoring carry-out. Alternately, for the case where the encryption was done using XOR, by XORing a first byte of the encrypted payload 204' with the first byte of the long key 140 at the key offset 304, and may generate the second byte of the encrypted payload 204' by XORing a second byte of the decrypted payload 204 with the second byte of the long key 140 at the key offset 304. The autonomous vehicle security server 142 may continue generating of the decrypted payload 204 in such a manner until the encrypted payload 204' of the destination request 134 is fully decrypted.

Figure 4A:
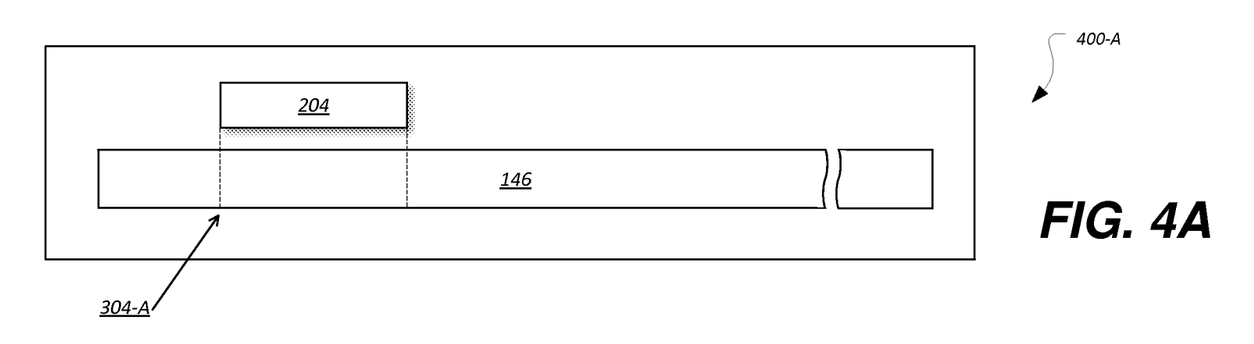
FIG. 4A illustrates an example key offset into the long key for encryption or decryption of the destination request.

FIG. 4A illustrates an example 400-A key offset 304-A into the long key 146 for encryption or decryption of the destination request 134. As shown, the key offset 304-A is to a location near the beginning of the long key 146. The payload 204 of the destination request 134 may accordingly be encrypted using the bytes of the long key 146 beginning at the key offset 304-A, and continuing sequentially for the length of the payload 204 of the destination request 134.

Figure 4B:
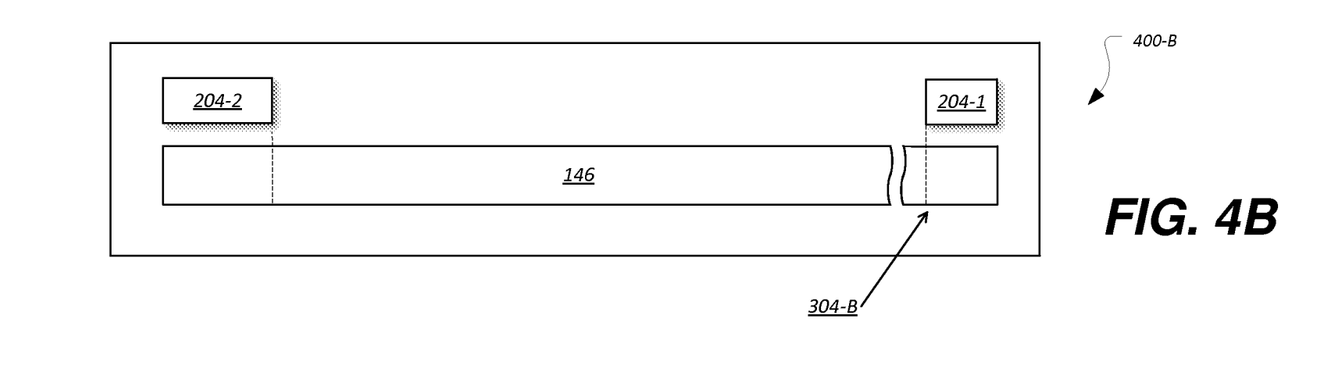
FIG. 4B illustrates an alternate example key offset into the long key for encryption or decryption of the destination request.

FIG. 4B illustrates an alternate example 400-B key offset 304-B into the long key 146 for encryption or decryption of the destination request 134. As shown, the key offset 304-B is to a location near the end of the long key 146. Thus, as the end of the long key 146 is reached before the end of the payload 204 of the destination request 134, the long key 146 "rolls" over to the beginning. This rolling over accordingly allows the encryptor 302 and decryptor 306 to continue processing the payload 204 of the destination request 134 despite the end of the long key 146 having been reached. For instance, a first portion of the payload 204-1 of the destination request 134 is processed using the end of the long key 146, and a second portion of the payload 204-2 of the destination request 134 is processed using the beginning of the long key 146.

Figure 5:
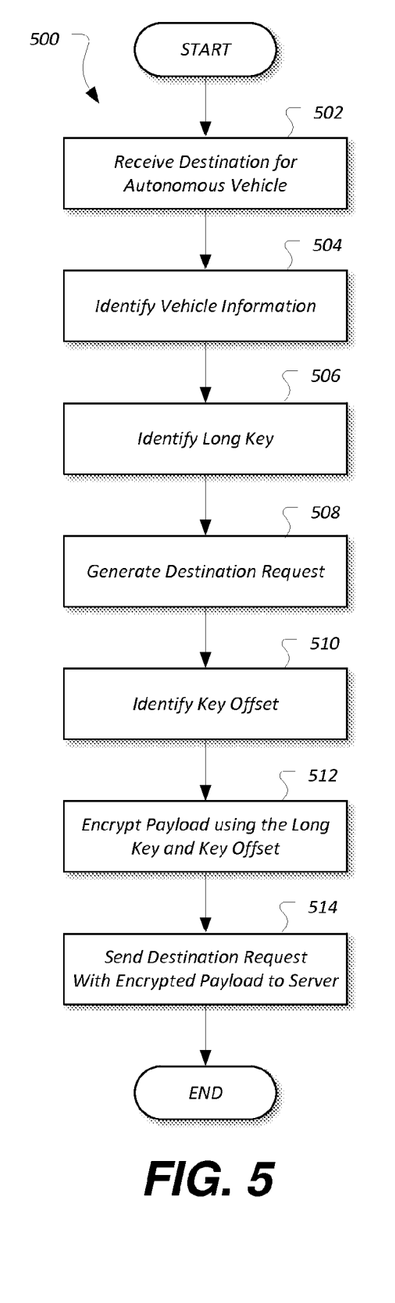
FIG. 5 illustrates an example process for encrypting destination requests by a requester of a destination location for the autonomous vehicle.

FIG. 5 illustrates an example process 500 for encrypting destination requests 134 by a requester of a destination location for the autonomous vehicle 102. As shown, the process 500 may be performed by the destination request application 132 of the mobile device 122 or another requester of a destination for the vehicle 102 acting as the encryptor 302 and in communication with the autonomous vehicle security server 142 over the network 116.

At operation 502, the requester receives destination location 212 information for the autonomous vehicle 102. In an example, a user may utilize the destination request application 132 of the mobile device 122 to request that a destination request 134 be sent to the autonomous vehicle security server 142 to move the vehicle 102 to a destination specified by the user.

At operation 504, the requester identifies vehicle identification information 136 for the autonomous vehicle 102. In an example, the destination request application 132 may retrieve the VIN or other vehicle identification information 136 from the storage 130 of the mobile device 122. In another example, the vehicle identification information 136 may be entered or selected by the user of the destination request application 132.

At operation 506, the requester identifies a long key 146 for the autonomous vehicle 102. In an example, the destination request application 132 may retrieve the long key 146 from the storage 130 of the mobile device 122.

At operation 508, the requester generates the destination request 134. In an example, the destination request application 132 may generate a packet header 202 of the destination request 134 including vehicle the vehicle identification information 136 and a timestamp 206 according to the current time. The destination request application 132 may further generate a payload 204 of the destination request 134 including the vehicle identification information 136 and a representation of the requested destination location 212. The payload 204 may further include additional information, such as one or more of the user identifier 208 of the user requesting the destination of the vehicle 102 (e.g., an identifier of the user of the mobile device 122), a message identifier indicating that the destination request 134 is of a vehicle-destination type, and an end-of-message 214 marker indicating the end of the payload 204 data.

At operation 510, the requester identifies the key offset 304 into the long key 146 to use to encrypt the payload 204 of the destination request 134. In an example, the destination request application 132 may utilize the timestamp 206 value to generate a number to use as the key offset 304 into the long key 146.

At operation 512, the requester encrypts the payload 204 of the destination request 134. For example, having identified the appropriate long key 146 and key offset 304, the destination request application 132 may encrypt each byte of the payload 204 of the destination request 134 into an encrypted payload 204' using a different corresponding byte of the long key 146.

At operation 514, the requester sends the destination request 134 to the autonomous vehicle security server 142. In an example, the destination request application 132 may send the destination request 134 over the network 116 to the autonomous vehicle security server 142. Accordingly, the destination request application 132 may send the destination request 134 with the encrypted payload 204' keyed to the specific vehicle 102 to perform the destination request 134. After operation 514, the process 500 ends.

Figure 6:
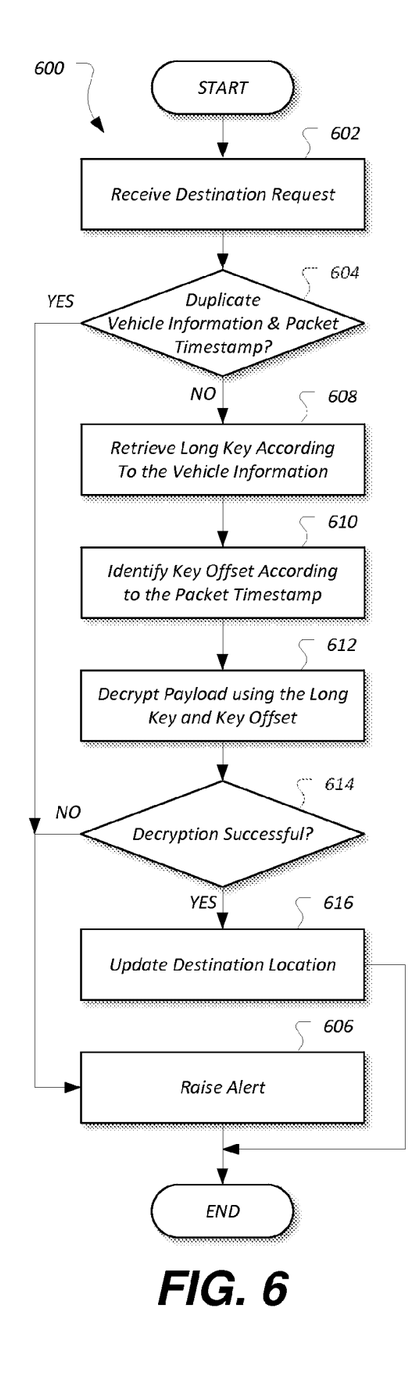
FIG. 6 illustrates an example process for decryption and verification of destination requests by the autonomous vehicle security server.

FIG. 6 illustrates an example process 600 for decryption and verification of destination requests 134 by the autonomous vehicle security server 142. As shown, the process 600 may be performed by the autonomous vehicle security server 142 acting as the decryptor 306 and in communication with the vehicle 102 over the network 116.

As operation 602, the autonomous vehicle security server 142 receives the destination request 134. In an example, the autonomous vehicle security server 142 may receive the destination request 134 sent in accordance with the process 500 discussed in detail above.

As operation 604, the autonomous vehicle security server 142 determines whether the destination request 134 includes duplicate vehicle identification information 136 and timestamp 206 to a previously received destination request 134. In an example, the autonomous vehicle security server 142 may maintain a history of previous destination requests 134 (or at least packet headers 202 of previous destination requests 134), and may compare the received destination request 134 to identify whether the vehicle identification information 136 and timestamp 206 of the received destination request 134 matches that of a previously received destination request 134. If the destination request 134 matches a destination request 134 in the history, then the destination request 134 may be fraudulent, and control passes to operation 606 to raise an alert. Otherwise, control passes to operation 608 to continue processing the received destination request 134. In another example, the autonomous vehicle security server 142 may additionally or alternately compare the timestamp 206 to ensure that the timestamp 206 is recent (e.g., within a predetermined amount of time from the current time, such as a minute, five minutes, an hour, within twenty-four hours, the same day as, etc.) and may raise an alert if the timestamp 206 is not determined by the autonomous vehicle security server 142 to be recent.

As operation 606, the autonomous vehicle security server 142 raises an alert. In an example, the autonomous vehicle security server 142 may send an alert to contact information of an owner or operator of the vehicle 102, such as a fleet manager. In another example, the autonomous vehicle security server 142 may inform authorities, such as police, of the alert condition. The alert may include, for example, the vehicle identification information 136 as well as other information about the vehicle 102, such as current or recent location information, if available. After operation 606, the process 600 ends.

As operation 608, the autonomous vehicle security server 142 retrieves the long key 146 to use to decrypt the destination request 134. In an example, the autonomous vehicle security server 142 may retrieve the long key 146 from the data store 138 that is associated with the vehicle identification information 136 included in the packet header 202 of the received destination request 134.

As operation 610, the autonomous vehicle security server 142 identifies the key offset 304 into the long key 146 to use to decrypt the encrypted payload 204' of the received destination request 134. In an example, the autonomous vehicle security server 142 utilizes the timestamp 206 value to generate a number to use as the key offset 304 into the long key 146, similar to the generation of the key offset 304 as described above with reference to operation 510.

As operation 612, the autonomous vehicle security server 142 decrypts the encrypted payload 204' of the received destination request 134. In an example, having identified the appropriate long key 146 and key offset 304, the autonomous vehicle security server 142 may decrypt each byte of the encrypted software update 120' using a different byte of the long key 146.

As operation 614, the autonomous vehicle security server 142 determines whether the decryption was successful. In an example, the autonomous vehicle security server 142 may confirm that a VIN of the vehicle 102 included in the payload 204, as decrypted, matches the same information provided in the unencrypted packet header 202 of the destination request 134. If the decryption is successful, control passes to operation 616. If not, control passes to operation 606 to send an alert.

As operation 616, the autonomous vehicle security server 142 updates the destination location 212 of the autonomous vehicle 102. In an example, the autonomous vehicle security server 142 may generate a driving command 144 to send to the vehicle 102, encrypt the driving command 144 using a long key 140 associated with the vehicle 102, and send the encrypted driving command 144 to the vehicle 120 to request the vehicle 102 to proceed to the destination location 212. After operation 616, the process 600 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a server, including memory and one or more hardware processors, configured to
        receive, over a network from a requesting device, an encrypted payload of a destination request specifying a destination location for an autonomous vehicle, the destination request including a vehicle identifier in a header of the destination request,
        validate uniqueness of a timestamp of the destination request,
        retrieve a long key from a data store of the server by querying the data store for the Ion key associated with the vehicle identifier,
        decrypt the encrypted payload to identify the destination location using a long key indexed to a key offset determined using the timestamp, and
        send a driving command to the autonomous vehicle specifying the destination location.

2. The system of claim 1, wherein the server is further configured to raise an alert when validation of uniqueness of the timestamp of the destination request fails.

3. The system of claim 1, wherein the long key includes a random string of bytes at least as long as a length in bytes of the encrypted payload.

4. The system of claim 1, wherein the server is further configured to decrypt the encrypted payload by performing an inverse of a mathematical operation performed, using an unencrypted payload and the long key, to encrypt the encrypted payload.

5. The system of claim 4, wherein the mathematical operation is one of addition, subtraction ignoring carry-out, and exclusive-or.

6. The system of claim 1, wherein the encrypted payload includes the vehicle identifier in encrypted form, and the server is further configured to validate the destination request by comparing the vehicle identifier included in the header and a vehicle identifier decrypted from the encrypted payload.

7. A system comprising:
    a mobile device configured to
        receive a destination location for an autonomous vehicle;
        generate a destination request, including a packet header specifying a timestamp and a vehicle identifier of the autonomous vehicle, specifying the destination location;
        identify a key offset into a long key using the timestamp;
        encrypt a payload of the destination request using the key offset; and
        send the destination request to a server to forward to the autonomous vehicle.

8. The system of claim 7, wherein the mobile device is further configured to retrieve the long key from storage of the mobile device.

9. The system of claim 7, wherein the long key includes a random string of bytes at least as long as a length in bytes of the payload of the destination request.

10. The system of claim 7, wherein the mobile device is further configured to encrypt the payload by performing a reversible mathematical operation using the payload and the long key.

11. The system of claim 10, wherein the mathematical operation is one of addition, subtraction ignoring carry-out, and exclusive-or.

12. A computer-implemented method comprising:
    receiving a request specifying a destination for an autonomous vehicle identified by a vehicle identifier included in a header of the request;
    validating uniqueness of a request timestamp for the vehicle identifier;
    retrieving a long key from a data store by querying the data store for the long key associated with the vehicle identifier;
    decrypting a request payload to identify the destination using the long key indexed to a key offset determined using the timestamp; and sending a driving command to the autonomous vehicle specifying the destination.

13. The method of claim 12, further comprising raising an alert when validation of uniqueness of the request timestamp fails.

14. The method of claim 12, wherein the long key includes a random string of bytes at least as long as a length in bytes of the payload.

15. The method of claim 12, further comprising decrypting the payload by performing a reverse of a mathematical operation performed using an unencrypted payload and the long key to encrypt the payload.

16. The method of claim 15, wherein the mathematical operation is one of addition, subtraction ignoring carry-out, and exclusive-or.

17. The method of claim 12, wherein the payload includes the vehicle identifier in encrypted form, and further comprising validating the request by matching the vehicle identifier included in the header and a vehicle identifier decrypted from the payload.

* * * * *